(12) United States Patent
Barber et al.

(10) Patent No.: US 8,308,069 B2
(45) Date of Patent: Nov. 13, 2012

(54) USER CONFIGURABLE SEARCH METHODS FOR AN AREA IMAGING INDICIA READER

(75) Inventors: Charles Paul Barber, Fayetteville, NY (US); Robert M. Hussey, Camillus, NY (US)

(73) Assignee: Hand Held Products, Inc., Skaneateles Falls, NY (US)

( * ) Notice: Subject to any disclaimer, the term of this patent is extended or adjusted under 35 U.S.C. 154(b) by 458 days.

(21) Appl. No.: 12/004,682

(22) Filed: Dec. 21, 2007

(65) Prior Publication Data

US 2009/0159684 A1    Jun. 25, 2009

(51) Int. Cl.
*G06K 7/01* (2006.01)
(52) U.S. Cl. .................................................. 235/462.11
(58) Field of Classification Search . 235/462.01–462.49
See application file for complete search history.

(56) References Cited

U.S. PATENT DOCUMENTS

| | | | |
|---|---|---|---|
| 7,325,737 B2* | 2/2008 | Epshteyn et al. | 235/462.08 |
| 2005/0023355 A1* | 2/2005 | Barrus | 235/462.15 |
| 2008/0105747 A1* | 5/2008 | Orlassino | 235/462.41 |
| 2010/0027741 A1* | 2/2010 | Doyle et al. | 378/57 |

* cited by examiner

*Primary Examiner* — Thien M Le
*Assistant Examiner* — Christle Marshall
(74) *Attorney, Agent, or Firm* — Hiscock & Barclay, LLP (57) ABSTRACT

A method of operating an optical reading device for collecting and processing indicia data comprising the steps of: converting light with an image sensor into output signals representative of an image in a field of view (FOV) of the image sensor; user programming a processor to search the output signals according to a search strategy; searching the output signals for an information bearing indicia (IBI) within the FOV according to the user programmed search strategy; and, decoding information contained in the IBI.

10 Claims, 6 Drawing Sheets

USER CONFIGURABLE SEARCH METHODS FOR AN AREA IMAGING INDICIA READER

FIELD OF THE INVENTION

The present invention relates to image reader devices, and more particularly to a exemplary method of operating an image reader to find dataforms in images.

BACKGROUND

Indicia reading devices (also referred to as readers, readers, etc.) typically read data represented by printed indicia, (also referred to as symbols, symbology, bar codes, etc.) For instance one type of a symbol is an array of rectangular bars and spaces that are arranged in a specific way to represent elements of data in machine readable form. Optical indicia reading devices typically transmit light onto a symbol and receive light scattered and/or reflected back from a bar code symbol or indicia. The received light is interpreted by an image processor to extract the data represented by the symbol. Laser indicia reading devices typically utilize transmitted laser light.

One-dimensional (1D) optical bar code readers are characterized by reading data that is encoded along a single axis, in the widths of bars and spaces, so that such symbols can be read from a single scan along that axis, provided that the symbol is imaged with a sufficiently high resolution along that axis.

In order to allow the encoding of larger amounts of data in a single bar code symbol, a number of 1D stacked bar code symbologies have been developed which partition encoded data into multiple rows, each including a respective 1D bar code pattern, all or most all of which must be scanned and decoded, then linked together to form a complete message. Scanning still requires relatively higher resolution in one dimension only, but multiple linear scans are needed to read the whole symbol.

A class of bar code symbologies known as two dimensional (2D) matrix symbologies have been developed which offer orientation-free scanning and greater data densities and capacities than 1D symbologies. 2D matrix codes encode data as dark or light data elements within a regular polygonal matrix, accompanied by graphical finder, orientation and reference structures. Often times an optical reader may be portable and wireless in nature thereby providing added flexibility. In these circumstances, such readers form part of a wireless network in which data collected within the terminals is communicated to a host computer situated on a hardwired backbone via a wireless link. For example, the readers may include a radio or optical transceiver for communicating with a network computer.

Conventionally, a reader, whether portable or otherwise, may include a central processor which directly controls the operations of the various electrical components housed within the bar code reader. For example, the central processor controls detection of keyboard entries, display features, wireless communication functions, trigger detection, and bar code read and decode functionality.

Efforts regarding such systems have led to continuing developments to improve their versatility, practicality and efficiency.

DETAILED DESCRIPTION

Reference will now be made to exemplary embodiments of the invention which are illustrated in the accompanying drawings. This invention, however, may be embodied in various forms and should not be construed as limited to the embodiments set forth herein. Rather, these representative embodiments are described in detail so that this disclosure will be thorough and complete, and will fully convey the scope, structure, operation, functionality, and potential of applicability of the invention to those skilled in the art. Wherever possible, the same reference numbers will be used throughout the drawings to refer to the same or like parts.

Figure 1:
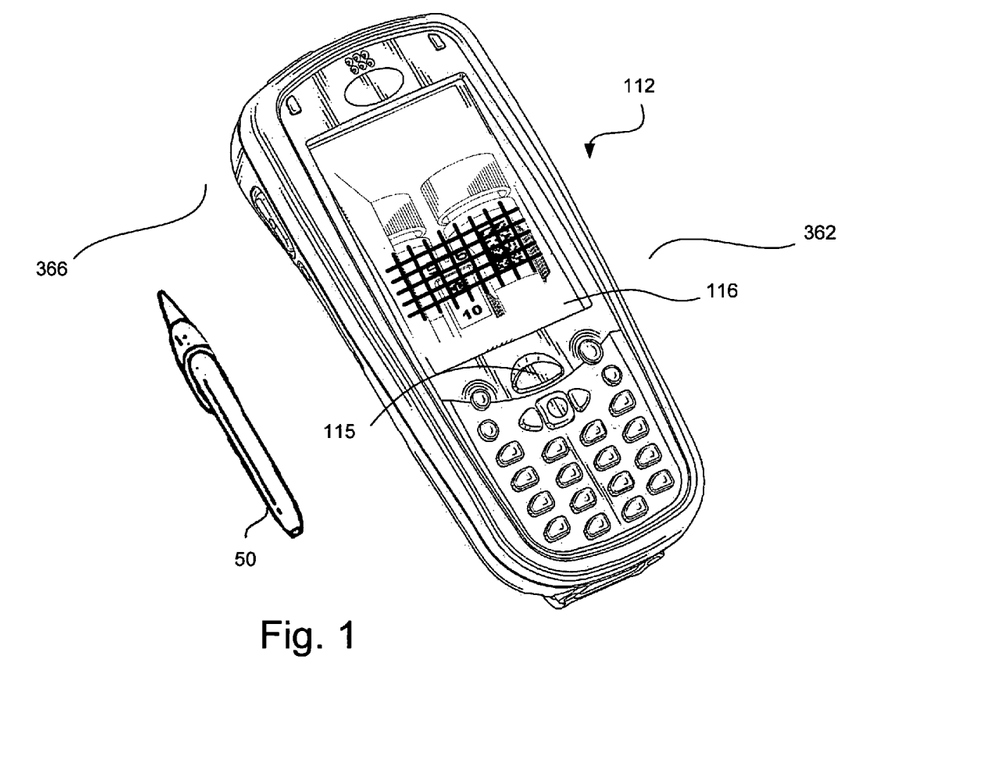
FIG. 1 is a perspective view of an exemplary image reader.
Figure 2:
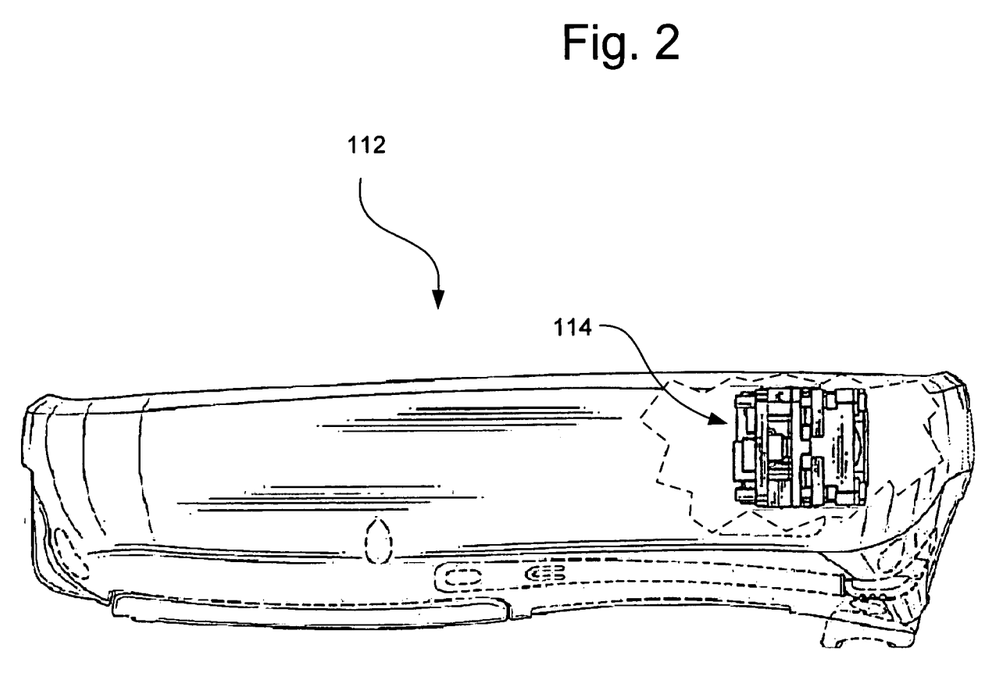
FIG. 2 is a fragmentary partially cutaway side view of an exemplary image reader.

Referring to FIGS. 1 and 2, an exemplary image reading device, such as a scanner, personal digital assistant (PDA) 112, portable data terminal (PDT), scanner, etc. that may be a platform for an image reading assembly 114 having the capability for capturing and reading images, some of which may have symbol indicia provided therein. For exemplary purposes only, image reading devices will be exemplified herein in terms of PDAs, which may be typically defined as handheld devices used as a personal organizer, and having many uses such as reading information bearing indicia, calculating, use as a clock and calendar, playing computer games, accessing the Internet, sending and receiving E-mails, use as a radio or stereo, video recording, recording notes, use as an address book, and use as a spreadsheet. A plurality of buttons or keys 115 may be used to control operation of the PDA and the imaging reader assembly 114. A display 116 may be utilized to provide a user an interface for a user, such as a graphical user interface (GUI).

PDAs may be equipped with the ability to query and receive and transmit data, such as software via a communication link, such as by radio link or wired link. Upgrading firmware from host processor to PDA (also referred to as uploading or pushing) and duplicating configuration parameters may be performed by reading specific indicia to ensure PDAs are operating at the proper revision and have the proper configuration parameters.

A PDT is typically an electronic device that is used to enter or retrieve data via wireless transmission (WLAN or WWAN) and may also serve as an indicia reader used in a stores, warehouse, hospital, or in the field to access a database from a remote location.

The PDA 112 may be a Hand Held Products Dolphin® series or the like and may include a cradle connected to a computer by a cable or wireless connection to provide two-way data communication therebetween. The computer may be replaced with a different processing device, such as a data processor, a laptop computer, a modem or other connection to a network computer server, an internet connection, or the like. The PDA may include a display and keys mounted in a case to activate and control various features on the PDA. The display may be a touch screen LCD that allows the display of various icons representative of different programs available on the PDA which may be activated by finger pressure or the touch of a stylus. The display may also be used to show indicia, graphs, tabular data, animation, or the like.

Figure 3:
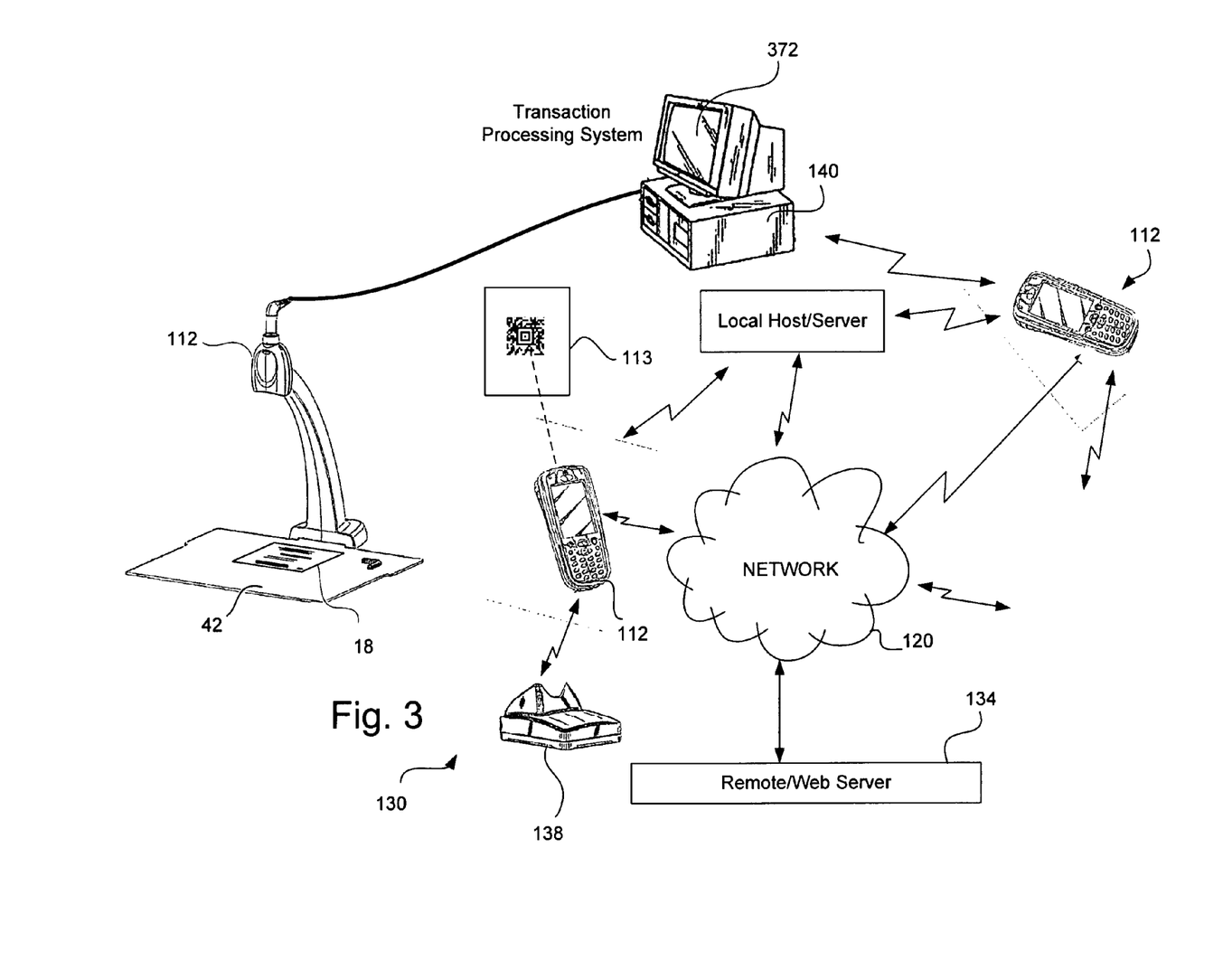
FIG. 3 is a block schematic diagram of an exemplary image reader system.

FIG. 3 illustrates a scanning system configuration in accordance with the present invention, wherein a plurality of readers 112 are being operated or utilized in a remote location, such as in a store point of sale (POS) warehouse or on a delivery truck. A reader may be in communication (wired or wireless) with the internet through the use of a local processing system 130, such as might be resident on a local server or computer having a wired or wireless router for providing internet service to a device or devices such as PDAs. The local processing system 130 may be in communication via the internet with a remote/web server 134 through a wired or wireless connection for the transfer of information over a distance without the use of electrical conductors or "wires". The distances involved may be short (a few meters as in television remote control) or very long (thousands or even millions of kilometers for radio communications). Wireless communication may involve radio frequency communication. Applications may involve point-to-point communication, point-to-multipoint communication, broadcasting, cellular networks and other wireless networks. This may involve: cordless telephony such as DECT (Digital Enhanced Cordless Telecommunications); Cellular systems such as 0G, 1G, 2G, 3G or 4G; Short-range point-to-point communication such as IrDA or RFID (Radio Frequency Identification), Wireless USB, DSRC (Dedicated Short Range Communications); Wireless sensor networks such as ZigBee; Personal area networks such as Bluetooth or Ultra-wideband (UWB from WiMedia Alliance); Wireless computer networks such as Wireless Local Area Networks (WLAN), IEEE 802.11 branded as WiFi or HIPERLAN; or Wireless Metropolitan Area Networks (WMAN) and Broadband Fixed Access (BWA) such as LMDS, WiMAX or HIPERMAN.

The Internet is the worldwide, publicly accessible network of interconnected computer networks that transmit data by packet switching using the standard Internet Protocol (IP). It is a "network of networks" that consists of millions of smaller domestic, academic, business, and government networks, which together carry various information and services, such as electronic mail, online chat, file transfer, and the inter-linked Web pages and other documents of the World Wide Web. The IP is a data-oriented protocol used for communicating data across a packet-switched internetwork, and may be a network layer protocol in the internet protocol suite and encapsulated in a data link layer protocol (e.g., Ethernet). As a lower layer protocol, the IP provides the service of communicable unique global addressing amongst computers to provide a service not necessarily available with a data link layer.

Ethernet provides globally unique addresses and may not be globally communicable (i.e., two arbitrarily chosen Ethernet devices will only be able to communicate if they are on the same bus). IP provides final destinations with data packets whereas Ethernet may only be concerned with the next device (computer, router, etc.) in the chain. The final destination and next device could be one and the same (if they are on the same bus) but the final destination could be remotely located. IP can be used over a heterogeneous network (i.e., a network connecting two computers can be any mix of Ethernet, ATM, FDDI, Wi-fi, token ring, etc.) and does not necessarily affect upper layer protocols.

One or more PDA may be outfitted with a communication module configured to communicate with other PDAs that have an appropriate type communication module. One or more PDA may be configured to communicate with a base unit 138 configured to interface between the PDA and a network.

In the case of a mobile hand held optical PDA hardwired to its individual base unit, this link between the PDA and base unit is fixed and permanent. In the case of a wireless mobile hand held optical PDA that communicates wirelessly with its individual base unit, this link can be made by programming the PDA with information identifying the particular base unit so the PDA directs its transmitted information to that base unit, or vice versa.

One or more readers 112 may be in communication (wired or wireless) with a local transaction processing system, such as a local point of sale register 140. The local point of sale register 140 may be in communication via a wired or wireless connection for the transfer of information over a distance without the use of electrical conductors or "wires".

The information bearing indicia may be displayed on and read from an exemplary display, such as may be disposed on a platform such as PC monitor, mobile phone, portable data terminal (PDT), personal digital assistant (PDA), etc. A Portable Data Terminal, or PDT, is typically an electronic device that is used to enter or retrieve data via wireless transmission (WLAN or WWAN) and may also serve as an indicia reader used in a stores, warehouse, hospital, or in the field to access a database from a remote location. The information bearing indicia may also be printed on a printable medium 113, such as a product, packaging, etc. and then read by the reader. This would allow for users to receive a "software or firmware update" barcode electronically (i.e. email) and then simply view and scan the barcode on the PC.

In the exemplary embodiment, software or firmware installation may be completed by a user simply by access to a wired or wireless connection to a host server.

The terms "scan", "scanning" or "reading" use herein refers to reading or extracting data from an information bearing indicia (IBI), barcode or symbol.

Figure 4:
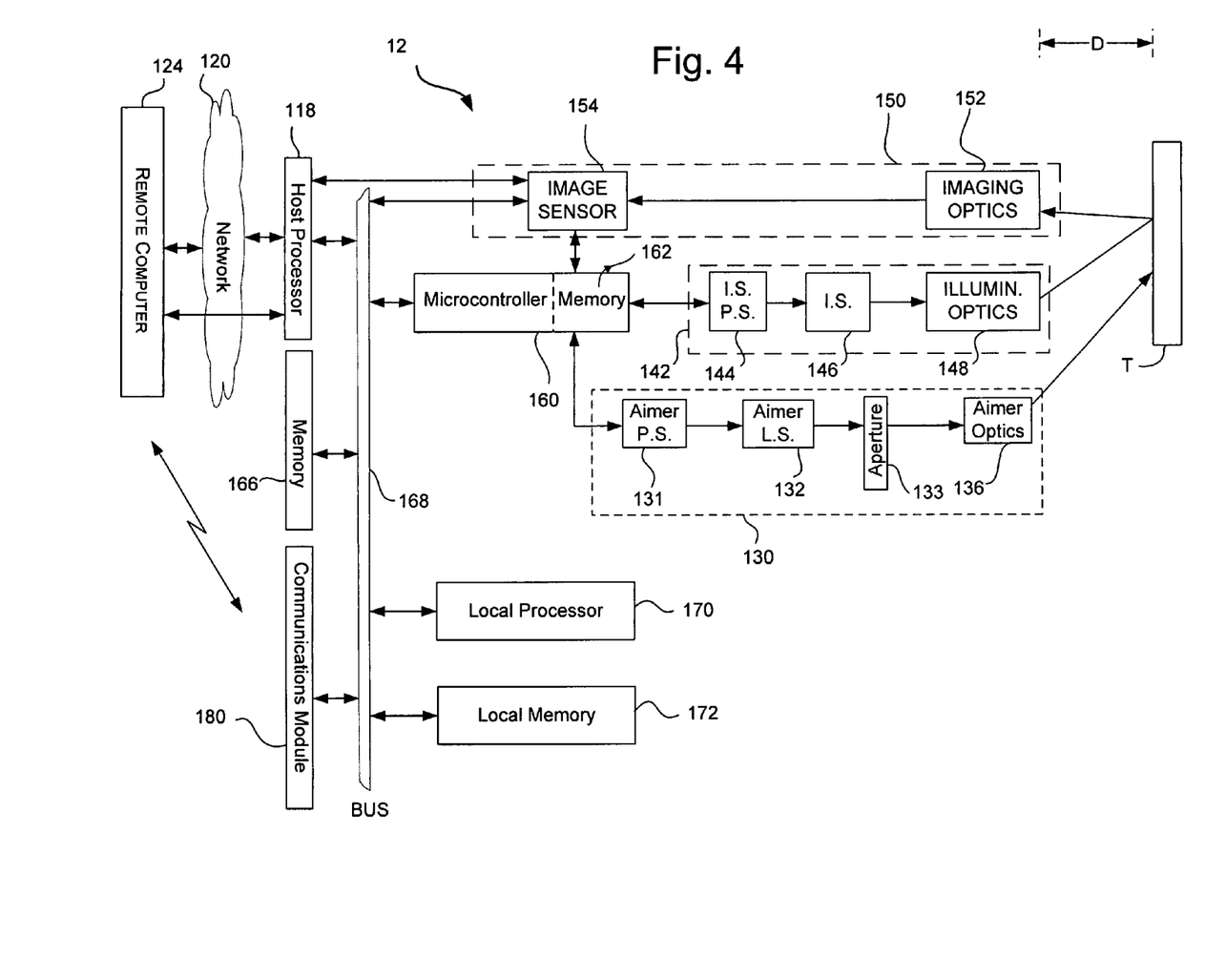
FIG. 4 is a block diagram of an exemplary indicia reader system.

Referring to FIGS. 2 and 4, an optical indicia reader 112 may have a number of subsystems for capturing and reading images, some of which may have symbol indicia provided therein. Reader 112 may have an imaging reader assembly 114 provided within a head portion or housing 116 which may be configured to be hand held by an operator. A trigger 115 may be used to control operation of the reader 112. Image reader assembly 114 has imaging receive optics 152 having an optical axis (OA) for receiving light reflected from a target T and directing or projecting the reflected light from the target T to an image sensor 154. The optical axis is a line of symmetry through the imaging optics.

The receive optics 152 has a focal point wherein parallel rays of light coming from infinity converge at the focal point. If the focal point is coincident with the image sensor, the target (at infinity) is "in focus". A target T is said to be in focus if light from target points are converged about as well as desirable at the image sensor. Conversely, it is out of focus if light is not well converged. "Focusing" is the procedure of adjusting the distance between the receive optics and the image sensor to cause the target T to be approximately in focus.

The target may be any object or substrate and may bear a 1D or 2D bar code symbol or text or other machine readable indicia. A trigger 115 may be used for controlling full or partial operation of the reader 112.

Image sensor 154 may be a two-dimensional array of pixels adapted to operate in a global shutter or full frame operating mode which is a color or monochrome 2D CCD, CMOS, NMOS, PMOS, CID, CMD, etc. solid state image sensor. This sensor contains an array of light sensitive photodiodes (or pixels) that convert incident light energy into electric charge. Solid state image sensors allow regions of a full frame of image data to be addressed. An exemplary CMOS sensor is model number MT9V022 from Micron Technology Inc. or model number VC5602V036 36CLCC from STMicroelectronics.

Further description of image sensor operation is provided in commonly owned U.S. patent application Ser. No. 11/077,995 entitled "BAR CODE READING DEVICE WITH GLOBAL ELECTRONIC SHUTTER CONTROL" filed on Mar. 11, 2005, which is hereby incorporated herein by reference in it's entirety.

In a full frame (or global) shutter operating mode, the entire imager is reset before integration to remove any residual signal in the photodiodes. The photodiodes (pixels) then accumulate charge for some period of time (exposure period), with the light collection starting and ending at about the same time for all pixels. At the end of the integration period (time during which light is collected), all charges are simultaneously transferred to light shielded areas of the sensor. The light shield prevents further accumulation of charge during the readout process. The signals are then shifted out of the light shielded areas of the sensor and read out.

Features and advantages associated with incorporating a color image sensor in an imaging device, and other control features which may be incorporated in a control circuit are discussed in greater detail in U.S. Pat. No. 6,832,725 entitled "An Optical Reader Having a Color Imager" incorporated herein by reference. It is to be noted that the image sensor 154 may read images with illumination from a source other than illumination source 146, such as by illumination from a source located remote from the reader.

The output of the image sensor may be processed utilizing one or more functions or algorithms to condition the signal appropriately for use in further processing downstream, including being digitized to provide a digitized image of target T. Microcontroller 160 may perform a number of functions. The particulars of the functionality of microcontroller 160 may be determined by or based upon certain configuration settings or data which may be stored in remote or local memory or firmware 162, 166, 172. One such function may be controlling the amount of illumination provided by illumination source 146 by controlling the output power provided by illumination source power supply 144. Microcontroller 160 may also control other functions and devices.

An exemplary microcontroller 160 is a CY8C24223A made by Cypress Semiconductor Corporation, which is a mixed-signal array with on-chip controller devices designed to replace multiple traditional MCU-based system components with one single-chip programmable device. It may include configurable blocks of analog and digital logic, as well as programmable interconnects.

Microcontroller 160 may include a predetermined amount of memory 162 for storing firmware and data. The firmware may be a software program or set of instructions embedded in or programmed on the microcontroller which provides the necessary instructions for how the microcontroller operates and communicates with other hardware. The firmware may be stored in the flash memory (ROM) of the microcontroller as a binary image file and may be erased and rewritten. The firmware may be considered "semi-permanent" since it remains the same unless it is updated. This firmware update or load may be handled by a device driver.

The components in reader 112 may be connected by one or more bus 168, data lines or other signal or data communication form. Exemplary forms may be an Inter-IC bus such as an I²C bus, dedicated data bud, RS232 interface, etc. An I²C bus is a control bus that provides a communications link between integrated circuits in a system. This bus may connect to a host computer in relatively close proximity, on or off the same printed circuit board as used by the imaging device. I²C is a two-wire serial bus with a software-defined protocol and may be used to link such diverse components as the image sensor 154, temperature sensors, voltage level translators, EEPROMs, general-purpose I/O, A/D and D/A converters, CODECs, and microprocessors/microcontrollers. A host processor 118 or a local processor 170 may be utilized to perform a number of functional operation, which may involve the performance of a number of related steps, the particulars of which may be determined by or based upon certain configuration settings stored in memory 166 which may be any one of a number of memory types such as RAM, ROM, EEPROM, etc. In addition some memory functions may be stored in memory 162 provided as part of the microcontroller 160.

An exemplary function of a processor 118, 170 may be to decode machine readable types of symbology or information bearing indicia (IBI) provided within the target or captured image. Examples may comprise one dimensional (or linear) symbologies, stacked symbologies, matrix symbologies, Composite symbologies, etc. One dimensional (or linear) symbologies which may include very large to ultra-small, Code 128, Interleaved 2 of 5, Codabar, Code 93, Code 11, Code 39, UPC, EAN, and MSI. Stacked symbologies may include PDF, Code 16K and Code 49. Matrix symbologies may include Aztec, Datamatrix, Maxicode, and QR-code. Composite symbologies may include linear symbologies combined with stacked symbologies. Other symbology examples may comprise OCR-A, OCR-B, MICR types of symbologies. UPC/EAN symbology or barcodes are standardly used to mark retail products throughout North America, Europe and several other countries throughout the worlds. Decoding is a term used to describe the interpretation of a machine readable code contained in an image captured by the image sensor 154. The code has data or information encoded therein. Information respecting various reference decode algorithm is available from various published standards, such as by the International Standards Organization ("ISO").

An exemplary function of host processor 118, 170 may be to manipulate images, such as cropping or rotation such as described herein. Imaging reader assembly 112 may also have an aiming generator light source 132, aiming aperture 133, aiming optics 136, an illumination source(s) 146 and illumination optics 148.

Illumination and aiming light sources with different colors may be employed. For example, in one such embodiment the image reader may include white and red LEDs, red and green LEDs, white, red, and green LEDs, or some other combination chosen in response to, for example, the color of the symbols most commonly imaged by the image reader. Different colored LEDs may be each alternatively pulsed at a level in accordance with an overall power budget. Aiming pattern generator 130 may include a power supply 131, light source 132, aperture 133 and optics 136 to create an aiming light pattern projected on or near the target which spans a portion of the receive optical system 150 operational field of view FOV) with the intent of assisting the operator to properly aim the scanner at the bar code pattern that is to be read. A number of representative generated aiming patterns are possible and not limited to any particular pattern or type of pattern, such as any combination of rectilinear, linear, circular, elliptical, etc. figures, whether continuous or discontinuous, i.e., defined by sets of discrete dots, dashes and the like.

Generally, the aiming light source may comprise any light source which is sufficiently small or concise and bright to provide a desired illumination pattern at the target. For example, light source 132 for aiming generator 130 may comprise one or more LEDs 134, such as part number NSPG300A made by Nichia Corporation.

The light beam from the LEDs 132 may be directed towards an aperture 133 located in close proximity to the LEDs. An image of this back illuminated aperture 133 may then be projected out towards the target location with a lens 136. Lens 136 may be a spherically symmetric lens, an aspheric lens, a cylindrical lens or an anamorphic lens with two different radii of curvature on their orthogonal lens axis. Alternately, the aimer pattern generator may be a laser pattern generator. The light sources 132 may also be comprised of one or more laser diodes such as those available from Rohm. In this case a laser collimation lens (not shown in these drawings) will focus the laser light to a spot generally forward of the scanning hear and approximately at the plane of the target T. This beam may then be imaged through a diffractive interference pattern generating element, such as a holographic element fabricated with the desired pattern in mind. Examples of these types of elements are known, commercially available items and may be purchased, for example, from Digital Optics Corp. of Charlotte, N.C. among others.

Image reader may include an illumination assembly 142 for illuminating target area T. Illumination assembly 142 may also include one or more power supplies 144, illumination sources 146 and illumination optics 148.

A communications module 180 provides a communication link from imaging reader 112 to other imaging readers or to other systems such as a server/remote processor 124.

The processor, memory and associated circuitry which performs or controls the exemplary image manipulations (e.g. image cropping function) described hereinbefore may be provided in the image reader assembly 114 or on associated circuit boards which are located within the housing 116 of the image reader 112.

It may be necessary for an image reader to find and decode multiple symbols or information bearing indicia (IBI) present in the imager field of view, particularly when the imager is mounted in a fixed position. An exemplary embodiment may be to permit an operator of the imager to program or modify a decoder search pattern to look or search for IBIs. An application provided on the image reader, transaction processing system, local/host server or the like may provide a user a way to configure a search method or strategy for different applications, depending upon their unique requirements. Fixed mounted applications for example, may have well defined characteristics that allow the search to be optimized. For example, upon initial setup of a fixed mount reading system, an operator, such as a field service technician, may assess the characteristics of the reading system and optimize the search pattern. For example, this may be done in a fixed mount system where the bar codes to be read are presented by a machine as opposed to a human since the barcodes may be positioned in nearly the same position and orientation on every read scan attempt. Once the characteristics of the first system have been set, they may be copied to all subsequent system at a point of manufacture.

Exemplary data or information that may be used to configure a search may take into account: that the IBIs being searched for may be of a certain type, such as data matrix; that the IBIs being searched for may have their finder patterns roughly parallel to the edges of the image; or that the IBIs being searched for may be in the "right half" of the image.

In an exemplary embodiment, the decoder may have a mode in which the decoder "draws" or displays search or finder pattern lines on an image for use as an aid by the user to tell whether or not the IBI is being found. A stylus 50 or other writing instrument may be utilized for drawing the search pattern.

In an exemplary embodiment, a reader may be commanded to operate in a special mode in which it would output an image, or multiple images to a host computer, with the search pattern superimposed on those images. The operator may be able to see whether the superimposed search pattern intersects an IBI of interest or not.

In an exemplary embodiment, the user may specify "clues" or instructions to the decoder. Such clues or instructions my comprise locations of where the IBIs are likely to be located, what types of IBIs may be expected, the order of locations search, etc. Such clues or instructions may be used optimize the search pattern. For example, the user may specify that only linear barcode that are oriented vertically in the image will be present, thereby allowing the search algorithms in the data processor to not use time search for horizontally oriented 1D codes, stacked codes, or 2D codes.

Figure 5:
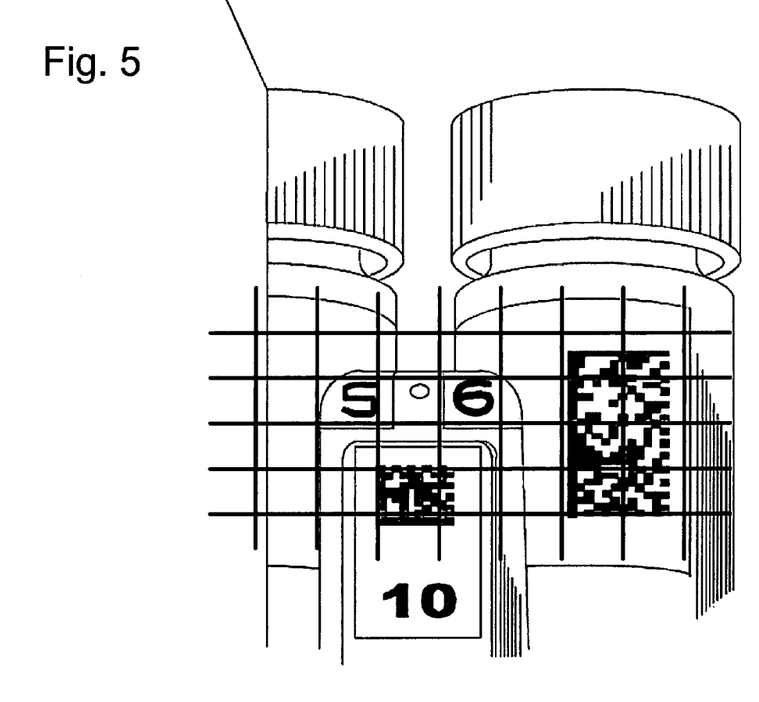
FIG. 5 is an exemplary GUI application for operating an image reader system.

FIG. 5 illustrates an exemplary method of configuring an IBI search strategy which may comprise a GUI application provided that may allow a user to "draw" search lines on an image. The application may then send this search pattern to the decoder for use in live searches. An exemplary GUI may be displayed on a host computer or transaction processing system 372 or a image reader 112 having a display.

An exemplary GUI application may be hosted by a PDT, a lap top computer, or a desktop computer, etc. The host computer may be collocated or remotely located from the image reader.

Figure 6:
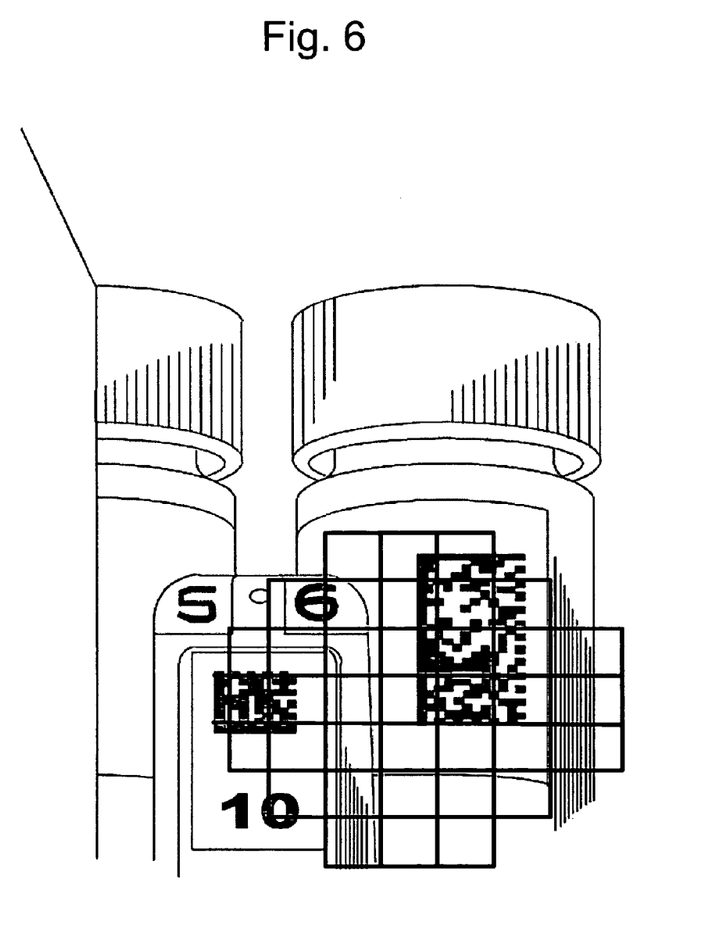
FIG. 6 is an exemplary GUI application for operating an image reader system.

FIG. 6 illustrates an exemplary method of configuring an IBI search strategy which may comprise a GUI application provided that may allow a user to "draw" search lines on an image. The application may then send this search pattern to the decoder for use in live searches.

Referring to FIG. 1, an exemplary image reading device 112 may have a display 116 on which a graphical user interface (GUI) 362 may be displayed. A GUI may be a type of user interface which allows operators to interact with an image reading device or other computer-controlled devices which may employ graphical icons, visual indicators or special graphical elements along with text, labels or text navigation to represent the information and actions available to the operator. The actions may be performed through direct manipulation of the graphical elements.

Described herein is an exemplary method of operating an optical reading device for collecting and processing indicia data in which the optical reading device comprises: an image sensor having an active area field of view (FOV) for converting light into output signals representative of an image in the FOV; receive optics for directing light from the FOV to the image sensor active area; and, a processor adapted to be programmed by a user for: searching the output signals according to a user programmed desired search strategy; searching the output signals for information bearing indicia (IBI) within the FOV according to the user programmed desired search strategy; decoding information contained in the IBI within the target derived from the output signals.

An exemplary search strategy may comprise at least one of the following: locating a second IBI according to it's position relative to a first IBI; locating an IBI relative to it's position within the FOV; locating an IBI relative to it's position to a point in two dimensional space; locating an IBI relative to it's position within a sub-region of a two dimensional space; locating an IBI relative to a starting point in the FOV; providing the operator with the option to ignore one or more located IBI; marking the position of IBI's that are found one or more times, and adapting subsequent searching as a function of the marked positions; and utilizing one or more of the following IBI characteristics: position; type; and quantity of.

Exemplary user programming may comprise at least one of the following: utilizing an external processor tool; capturing an image in a training mode similar to a future image captured in an operating mode; the user manually inputting the positions of each IBI during a training mode; storing the IBI positions found in a training mode for use to identify IBI positions during an operating mode; defining search strategy based on a user specified number of scans; and, programming more different profiles for different applications.

An exemplary optical reading device may have a processor adapted for altering located IBI information.

An exemplary optical reading device may have a processor adapted for storing multiple profiles in a memory and recalling different profiles during an operating mode.

An exemplary method of operating an optical reading device may be storing multiple search line patterns in a memory and recalling different search line patterns during an operating mode.

In an exemplary optical reading device the processor stores multiple search line patterns in a memory and recalls search line patterns during an operating mode.

An exemplary method of operating an optical reading device further comprises the step of ignoring information within a located IBI.

An exemplary optical reading device further comprises the step of ignoring information within a located IBI.

An exemplary optical reading device comprises the user programmed search strategy is based on a user specified number of scans.

An exemplary method of operating an optical reading device may be to facilitate programming different profiles for different user applications. A profile may be a set of user programmable information that configures the device for optimal performance in a given application It should be understood that the programs, processes, methods and apparatus described herein are not related or limited to any particular type of computer or network apparatus (hardware or software). Various types of general purpose or specialized computer apparatus may be used with or perform operations in accordance with the teachings described herein. While various elements of the preferred embodiments have been described as being implemented in software, in other embodiments hardware or firmware implementations may alternatively be used, and vice-versa. The illustrated embodiments are exemplary only, and should not be taken as limiting the scope of the present invention. For example, the steps of the flow diagrams may be taken in sequences other than those described, and more, fewer or other elements may be used in the block diagrams. Also, unless applicants have expressly disavowed any subject matter within this application, no particular embodiment or subject matter is considered to be disavowed herein.

The invention claimed is:

1. A method of operating an optical reading device for collecting and processing indicia data comprising the steps of:
    converting light with an image sensor into output signals representative of an image in a field of view (FOV) of the image sensor;
    user programming a processor to search the output signals according to a search strategy;
    searching the output signals for an information bearing indicia (IBI) within the FOV according to the user programmed search strategy; and,
    decoding information contained in the IBI,
    wherein the user programming comprises the user manually inputting the positions of each IBI during a training mode.

2. A method of operating an optical reading device according to claim 1, wherein the user programming comprises storing the IBI positions found in the training mode for use to identify IBI positions during an operating mode.

3. A method of operating an optical reading device for collecting and processing indicia data according to claim 1, wherein the searching comprises decoding IBIs in a desired order.

4. A method of operating an optical reading device according to claim 1, wherein the search strategy comprises marking the position of IBI's that are found one or more times, and adapting subsequent searching as a function of the marked positions.

5. A method of operating an optical reading device for collecting and processing indicia data comprising the steps of:
    converting light with an image sensor into output signals representative of an image in a field of view (FOV) of the image sensor;
    user programming a processor to search the output signals according to a search strategy;
    searching the output signals for an information bearing indicia (IBI) within the FOV according to the user programmed search strategy; and,
    decoding information contained in the IBI,
    wherein the user programming comprises defining a search strategy based on a user specified number of scans.

6. A method of operating an optical reading device according to claim 5, wherein the searching comprises providing the operator with the option to ignore one or more located IBI.

7. A method of operating an optical reading device for collecting and processing indicia data comprising the steps of:
    converting light with an image sensor into output signals representative of an image in a field of view (FOV) of the image sensor;
    providing a graphic user interface application for use by a user to program a processor to search the output signals according to a user programmed search strategy;
    searching the output signals for information bearing indicia (IBI) within the FOV according to the user programmed search strategy utilizing a decoder; and,
    decoding information contained in IBI utilizing the decoder,
    wherein the user uses the graphic user interface application to draw a search line pattern on an image and the application sends the search line pattern to the decoder for use in searching for IBI,
    wherein the user programming comprises storing IBI positions found in a training mode for use to identify IBI positions during an operating mode.

8. An optical reading device for collecting and processing indicia data comprising:
    an image sensor for converting light into output signals representative of an image in a field of view (FOV) of the image sensor;
    a graphic user interface for displaying the image; and,
    a graphic user interface application;
    a processor adapted for:
    running the graphic user interface application;
    user programming to search the output signals according to a user programmed search strategy;

searching the output signals for an information bearing indicia (IBI) within the FOV in a desired order according to the user programmed search strategy; and, decoding information contained in the IBI;

wherein the graphic user interface application is used by a user to draw a search line pattern on the displayed image and the search line pattern is used during decoding to search for IBI, wherein the user programming comprises storing IBI positions found in a training mode for use to identify IBI positions during an operating mode.

9. An optical reading device according to claim 8, wherein the search strategy comprises marking the position of IBI's that are found one or more times, and adapting subsequent searching as a function of the marked positions.

10. A method of operating an optical reading device for collecting and processing indicia data comprising the steps of:

converting light with an image sensor into output signals representative of an image in a field of view (FOV) of the image sensor;

providing a graphic user interface application for use by a user to program a processor to search the output signals according to a user programmed search strategy;

searching the output signals for information bearing indicia (IBI) within the FOV according to the user programmed search strategy utilizing a decoder; and, decoding information contained in IBI utilizing the decoder, wherein the user uses the graphic user interface application to draw a search line pattern on an image and the application sends the search line pattern to the decoder for use in searching for IBI, wherein the user programmed search strategy is based on a user specified number of scans.

* * * * *